US008823542B2

(12) United States Patent
Radivojevic et al.

(10) Patent No.: US 8,823,542 B2
(45) Date of Patent: Sep. 2, 2014

(54) APPARATUS AND METHODS RELEVANT TO ELECTRONIC DEVICES

(75) Inventors: Zoran Radivojevic, Cambridge (GB); Piers Andrew, Cambridge (GB)

(73) Assignee: Nokia Corporation, Espoo (FI)

( * ) Notice: Subject to any disclaimer, the term of this patent is extended or adjusted under 35 U.S.C. 154(b) by 1172 days.

(21) Appl. No.: 12/315,135

(22) Filed: Nov. 26, 2008

(65) Prior Publication Data

US 2010/0127819 A1   May 27, 2010

(51) Int. Cl.
*G05B 23/02* (2006.01)
*H04M 1/02* (2006.01)
(52) U.S. Cl.
CPC .................................. *H04M 1/0202* (2013.01)
USPC ....................................... 340/815.86; 340/7.1
(58) Field of Classification Search
USPC .................. 340/3.1, 825.36, 825.44, 825.45, 340/825.46, 7.1, 7.2, 7.22, 407.1, 815.62, 340/815.64, 815.71, 815.86, 815.87
See application file for complete search history.

(56) References Cited

U.S. PATENT DOCUMENTS

| | | | |
|---|---|---|---|
| 6,246,376 B1 * | 6/2001 | Bork et al. | 343/760 |
| 6,560,467 B1 * | 5/2003 | Kim | 455/567 |
| 2005/0237189 A1 * | 10/2005 | Tani | 340/541 |
| 2006/0258404 A1 * | 11/2006 | Arneson et al. | 455/566 |
| 2006/0287012 A1 | 12/2006 | Lan | 455/575.1 |
| 2008/0012980 A1 | 1/2008 | Yamane et al. | 348/373 |
| 2008/0214111 A1 | 9/2008 | Moshir et al. | 455/41.2 |

FOREIGN PATENT DOCUMENTS

| | | |
|---|---|---|
| CN | 1585412 A | 2/2005 |
| CN | 1934849 A | 3/2007 |
| EP | 1808673 A1 | 7/2007 |
| GB | 2378617 A | 2/2003 |
| GB | 2427529 A | 12/2006 |
| KR | 20050020430 | 3/2005 |

* cited by examiner

*Primary Examiner* — Kerri McNally
*Assistant Examiner* — Yong Hang Jiang
(74) *Attorney, Agent, or Firm* — Harrington & Smith

(57) ABSTRACT

Apparatus includes an actuator configured to provide vibrational movement of the apparatus in a first plane or having a component in the first plane, and a traction part configured to support a portion of the apparatus on a surface, a plane of the surface being perpendicular to the first plane, the traction part being configured to transform the vibrational movement of the apparatus into movement of the portion of the apparatus in a direction along the surface, the direction of the movement being predetermined by an orientation of the traction part.

30 Claims, 10 Drawing Sheets

US 8,823,542 B2

APPARATUS AND METHODS RELEVANT TO ELECTRONIC DEVICES

FIELD

This specification relates to apparatuses, for instance electronic devices, and to related methods and computer programs.

BACKGROUND

The use of actuators in electronic devices to create vibrations has long been known. The vibrations are generally intended to alert a user of the electronic device of a particular event.

SUMMARY

This specification provides apparatus comprising an actuator configured to provide vibrational movement of the apparatus in a first plane or having a component in the first plane, and a traction part configured to support a portion of the apparatus on a surface, a plane of the surface being perpendicular to the first plane, the traction part being configured to transform the vibrational movement of the apparatus into movement of the portion of the apparatus in a direction along the surface, the direction of the movement being predetermined by an orientation of the traction part.

This specification also provides apparatus comprising a traction part for supporting a device on a surface, the traction part being configured such as to transform vibrational movement in, or having a component in, a plane perpendicular to a plane of the surface into a net force along the surface in a direction predetermined by the configuration of the traction part.

This specification also provides apparatus comprising an orientation detector configured to detect an orientation of the apparatus, a processor configured to process a detected orientation of the apparatus, a location of the apparatus and received information identifying a location of interest in order to determine a direction from the apparatus to the location of interest, and a direction indicator configured to indicate to a user the direction from the apparatus to the location of interest.

This specification also provides apparatus comprising a processor configured to process a received orientation, a first location and received information identifying a location of interest in order to determine a direction from the first location to the location of interest, and to provide an output indicating the direction from the first location to the location of interest.

This specification also provides a method comprising processing a received orientation, a first location and received information identifying a location of interest, determining a direction from the first location to the location of interest, and providing an output indicating the direction from the first location to the location of interest.

This specification also provides a computer program product containing computer code which when executed by computer apparatus, controls the computer apparatus to perform a method comprising processing a received orientation, a first location and received information identifying a location of interest, determining a direction from the first location to the location of interest, and providing an output indicating the direction from the first location to the location of interest.

This specification also provides apparatus comprising an orientation detector configured to detect an orientation of the apparatus in at least two dimensions, an actuator configured to rotate the apparatus, and a processor configured to control the actuator based on the detected orientation of the apparatus, wherein the apparatus is a portable electronic device.

This specification also provides a method comprising detecting an orientation of an portable electronic device, and rotating the apparatus based on the detected orientation of the portable electronic device.

This specification also provides apparatus comprising an actuator configured to rotate the apparatus on a surface, a camera module configured to capture images, a processor configured to control the actuator to rotate the apparatus and to control the camera module to capture a plurality of images at a plurality of different orientations of the apparatus, wherein the apparatus is a portable device.

This specification also provides a method comprising rotating a portable electronic device comprising a camera module and an actuator configured to rotate said portable electronic device on a surface, and capturing a plurality of images using said camera module at a plurality of different orientations of the device.

DETAILED DESCRIPTION OF THE EMBODIMENTS

Figure 1A:
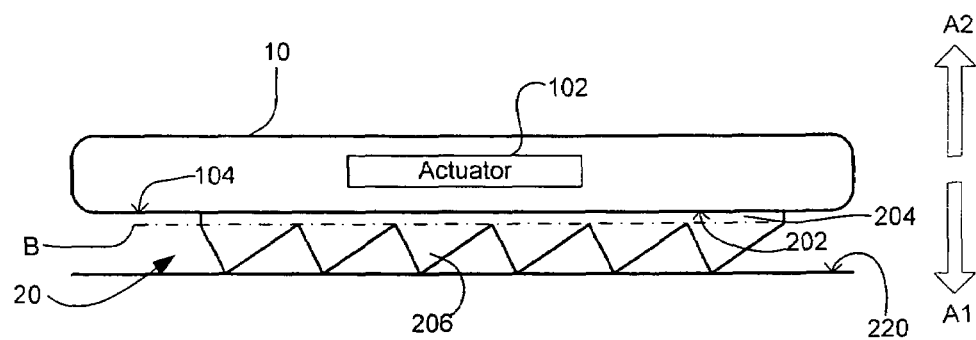
FIG. 1A depicts a schematic side-view of an electronic device according to embodiments.

In the drawings, like reference numerals denote like elements.

Figure 1B:
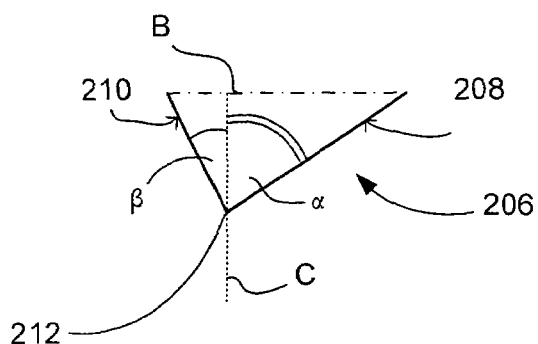
FIG. 1B depicts a side-view of one of the protruding portions shown in FIG. 1A.

FIG. 1A depicts a schematic side-view of an electronic device 10. FIG. 1B is a view of the underside of the device 10 of FIG. 1A.

The device 10 includes a vibration module 102. The vibration module 102 constitutes an actuator. Affixed to a lower surface 104 of the device 10 is an upper main surface 202 of a support pad 20. The support pad constitutes a traction part. The lower surface 104 of the device 10 is generally flat. The upper surface 202 of the support pad 20 is also flat. The shape of the upper surface 202 of the support pad may correspond to the shape of a portion of the lower surface of the device with which the upper surface 202 of the support pad 20 is in contact. For instance, if the lower surface 104 of the device 10 is instead convexly-curved, the upper surface 202 of the support pad 20 may be concavely-curved, thereby corresponding to the shape of the lower surface 104 of the device 10.

The support pad 20 comprises a base portion 204 and plural protruding portions 206. Each of the protruding portions 206 is asymmetric about a vertical axis. Each of the protruding portions 206 has generally the same profile. Each of the protruding portions 206 is oriented in the same direction. Each of the protruding portions 206 has the same asymmetry as the other protruding portions 206. The base portion has a uniform thickness. The base portion 204 extends from the upper surface 202 of the support pad 20 to a boundary (denoted by dashed line B) between the base portion 204 and the plural asymmetric protruding portions 206.

FIG. 1B is an enlarged view of one of the plurality of asymmetric protruding portions 206. Each protruding portion 206 has a first outer surface 208, a second outer surface 210 and a vertex 212 at a meeting point of the first and second outer surfaces 208, 210. The first outer surface 208 extends from the boundary B to the vertex 212. The second outer surface 210 extends from the boundary B to the vertex 212. A first angle between the first outer surface 208 and an axis (denoted C), which passes through the vertex 212 and is perpendicular to the boundary B, is denoted α. A second angle between the second outer surface 208 and the axis C is denoted β. The first and second angles α, β are different. This results in the protruding portions being asymmetric. In this embodiment, the first angle α is larger than the second angle β. Consequently, the vertical gradient of the first outer surface 208 is less than the average vertical gradient of the second outer surface 210. Consequently, the vertex 212 of each protruding portion 206 is situated nearer to the point at which the second outer surface 210 adjoins the boundary B than it is to the point at which the first outer surface 208 adjoins the boundary B. Each vertex 212 is the same distance from the boundary B as the other vertices 212.

The first and second outer surfaces 208, 210 have a substantially flat profile. It will be appreciated, however that other profile shapes may also be suitable, for example, a convexly curved shape.

In FIG. 1A, the device 10 is situated with the lower surface 104 facing down, on a hard surface, for example, a table-top 220. Consequently, each of the vertices 212 of the support pad 20 is in contact with the table-top 220. As such, the support pad 20 supports the device 10 on the table-top 220. Although not essential, it is preferable for each of the vertices 212 to be in contact with the table-top 220. Consequently, the distance from the upper surface 202 of the support pad 20 to each of the vertices 212 may vary. For example, when the lower surface 104 of the device 10 is not flat but is, for example, convexly-curved, the upper surface 202 of the support pad 20 may be concavely curved. In this case, the distance from the upper surface 202 of the support pad 20 to the vertices 212 may differ depending on the location on the support pad 20 of each protruding portion 206. For example, the vertices 212 of the protruding portions 206 that are closer the edges of the support pad 10 may be a greater distance from the upper surface 202 of the support pad 20 than the vertices 212 of the protruding portions 206 that are nearer to the centre of the support pad 20. In this way each of the vertices 212 is in the same plane and is in contact with the flat surface 220. The actuator 102 of the device 10 is arranged to cause vibrational movement of the device in at least a direction substantially towards the table-top 220 (denoted by arrow A1) and a direction substantially away from the table-top 220 (denoted by arrow A2). The actuator 102 may be a linear actuator, for example a spring loaded mass-electromagnetic coil actuator. The actuator may be instead an unbalanced rotary actuator. It may not be important that the actuator 102 also provides vibration in other directions as long as a component of the vibration is perpendicular to the plane of the surface 220. The word 'component' is used here in the vector sense.

Alternatively, the vibration may be provided by a piezo-bimorph actuator configured to provide haptic feedback to a user of a touch screen device. Here, the actuator is coupled to the touch screen, so as to effect vibration thereof when required. By controlling the actuator to vibrate for suitably long periods, this actuator can achieve rotation of the device without requiring a separate vibrational transducer.

Alternatively, the vibration may be provided by a audio vibrating module (a device operable to function as both a speaker and a mechanical vibrator). Here a membrane of the module may be loaded on demand with a small mass, thereby to allow multi-function for the module. In this way, the need for a separate vibrational transducer can be avoided.

It should be understood, however, that the actuator 102 may be replaced by any other alternative mechanism that is suitable for providing vibrational movement in at least directions A1 and A2.

Figure 1C:
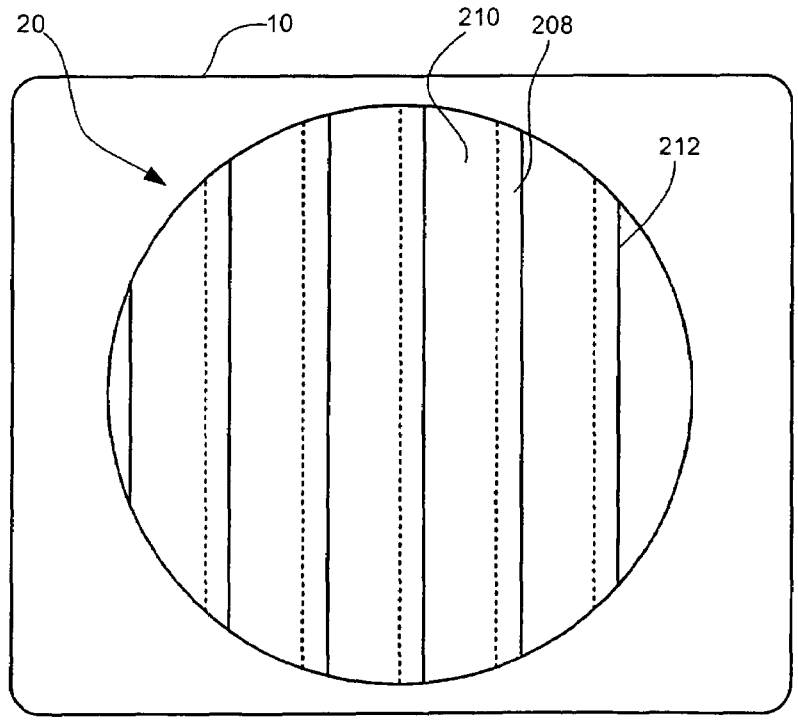
FIG. 1C depicts a schematic underside view of the device of FIG. 1A according to embodiments.

FIG. 1C depicts the underside of the device 10 and support pad 20. The support pad has a circular shape. It will, of course, be understood that other shapes, for example square, ellipsoidal or triangular may also be suitable. The solid lines running across the support pad 20 represent the vertices 212 of the protruding portions 206. The dashed lines represent the boundaries between each of the protruding portions 206. Although, in this embodiment, the protruding portions 206 have a length extending across the entire width of the support pad 20, it will be understood that each of the protruding portions 206 may instead comprise plural separate protruding portions adjacent to one another across the width of the support pad 20. In this way, the support pad 20 may comprise a two-dimensional array of protruding portions.

The support pad is comprised of an elastically deformable material, for example rubber, silicone-rubber (PDMS), styroflex, pellethane, santoprene, geolast, alcryn, kraton, pebax, nylon, or hytrel.

The support pad 20 transforms the vibrational movement of the device 10, provided by the actuator 102, into movement of the device 10 in a direction along the table-top 220. FIGS. 2A to 2D illustrate how this occurs.

Figure 2A:
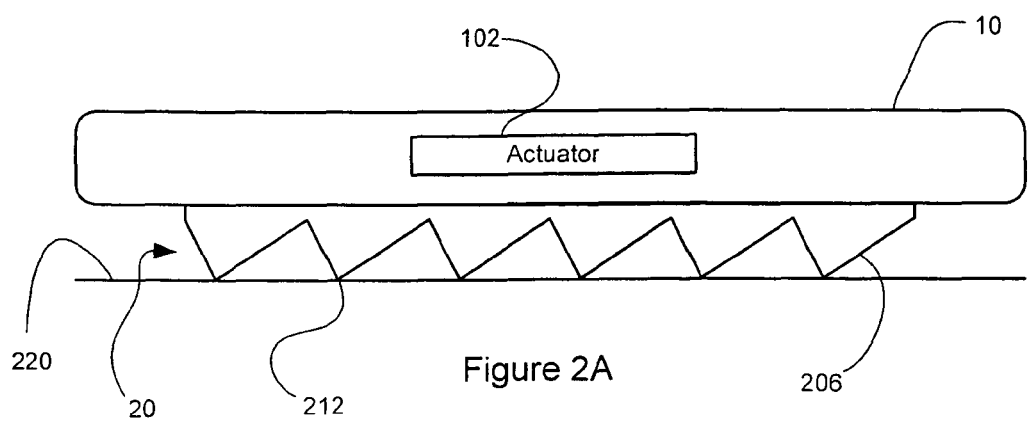
FIGS. 2A to 2D depict an operation of the device of FIG. 1A.

FIGS. 2A depicts the device 10 situated on the table-top 220 prior to the actuator 102 imparting vibrational movement to the device 10.

Figure 2B:
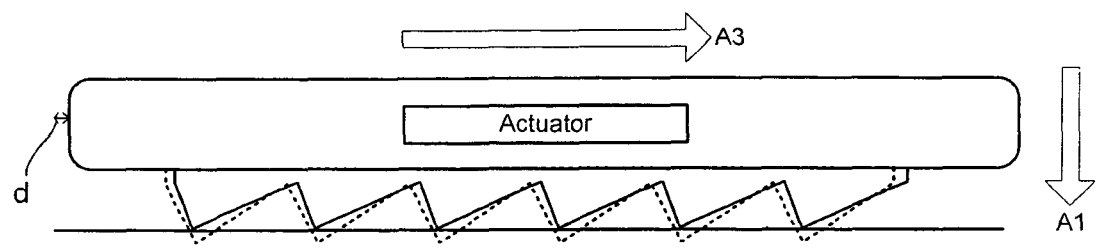

In FIG. 2B, the actuator is providing movement of the device in the direction (denoted by the arrow A1) substantially towards the table-top 220. This movement results in the device 10 imparting a force (also in the direction substantially towards the table-top 220) on the support pad 20. Due to friction between the vertices 212 and the surface 220, the vertices remain stationary. The friction is equal to the coefficient of friction multiplied by the reaction force from the surface 220 (the magnitude of which is equal to the weight of the device and support pad plus the downward force due to the actuator). This downward force due to the actuator causes a deformation of the protruding portions 206 of the support pad 20. The dashed lines in FIG. 2B show the original form of the protruding portions 206 of the support pad 20. The deformation results in a turning moment or rotation about the vertices 212 of the first and second outer surfaces 208, 210 in a direction towards the larger of the first and second angles α, β, which is in this case the first angle α. This causes the device 10 to be moved along the table-top 220 by a small distance (denoted d).

Figure 2C:
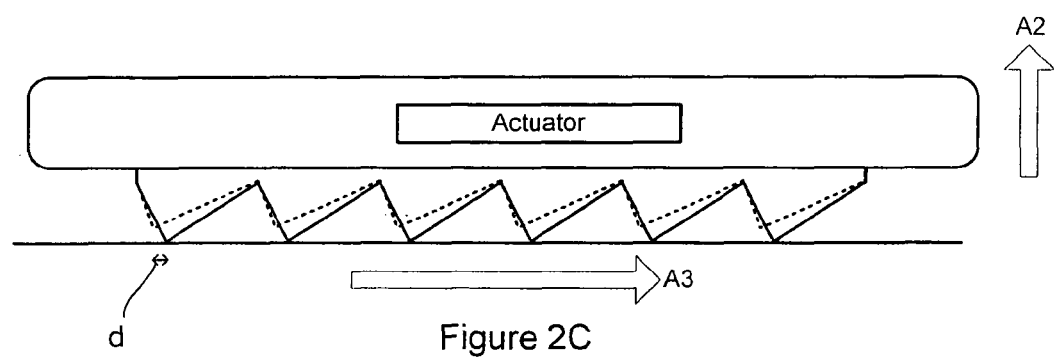

Following the vibrational movement of the device in direction A1, the actuator 102 provides movement of the device in the direction A2 substantially away from the table-top 220. This is shown in FIG. 2C. The elastic deformation of the protruding portions 206 caused by the initial downward movement of the device 10 results in a restoring force being exerted on the vertices 212 in a direction from left to right. Previously, this force was insufficient to overcome the frictional force between the table-top 220 and the vertices 212. However, when the actuator provides movement of the device 10 away from the table top 220, the force exerted by the vertices 212 on the table, and thus also the reaction force, is less than at the corresponding point in the opposite part of the cycle. This results in a reduced frictional force between the vertices 212 and the table-top. At a certain point during the upward movement of the device 10, the frictional force between the vertices 212 and the table-top 220 is reduced to such an extent that the restoring force of the protruding portions 206 is able to overcome the frictional force. Consequently, during the restoration of the protruding portions 206, the vertices move along the table-top by the small distance d.

Figure 2D:
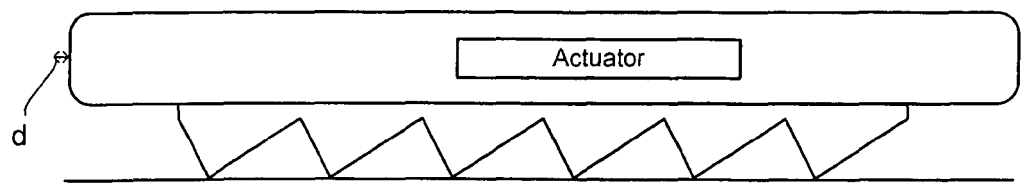

FIG. 2D depicts the device 10 in its new position, moved by a distance d from its starting position.

In this way, continued vibrational movement of the device 10 can be transformed into continued movement of the device 10 in a predetermined direction along the table-top 220.

It will be understood that the transformation of vibrational movement of the device 10 into movement of the device 10 in a predetermined direction along the table-top 220 may also be achieved using supports pads in which the protruding portions are of a different configuration to those described with reference to FIG. 1A. FIGS. 3A to 3D depict alternative configurations of the protruding portions 206 of the support pad 20 which transform vibrational motion of the device 10 into movement in a direction along the surface 220 in a direction from left to right.

Figure 3A:
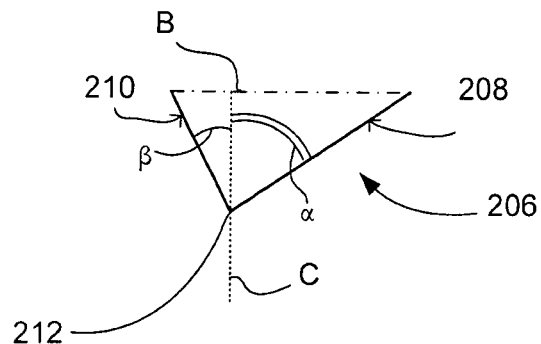
FIG. 3A to 3D depict alternative configurations of the protruding portions of FIG. 1A.
Figure 3B:
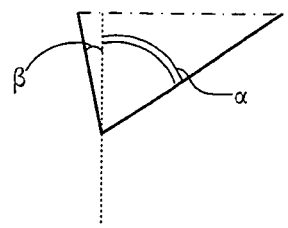
Figure 3C:
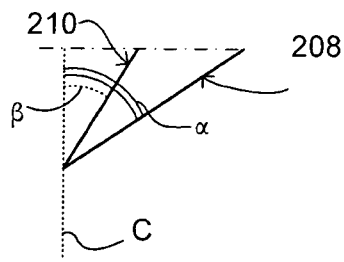
Figure 3D:
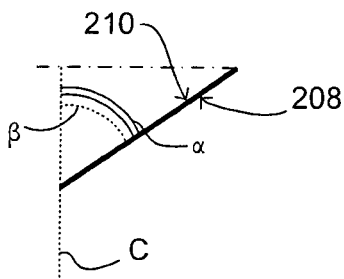

In each of FIGS. 3A to 3D, the first angle α is positive when to the right of axis C, and the second angle β is positive when to the left of the axis C. In each of the examples depicted in FIGS. 3A to 3B the first angle α is constant. The second angle β is gradually reduced from FIG. 3A to FIG. 3D. In FIG. 3D, the second angle β is equal to the negative of the first angle α. In this case, the protruding portion is approximate to a sheet (having depth into the figure), or a bristle (not having depth into the figure). The direction of movement into which vibration is transformed is dependent upon which of the first and second angles α, β is the largest, with the direction of movement being towards the larger of the two angles. Consequently, the protruding portions depicted in each of FIGS. 3A to 3D transform vibrational movement of a device into movement of the device in a direction from left to right.

Figure 4:
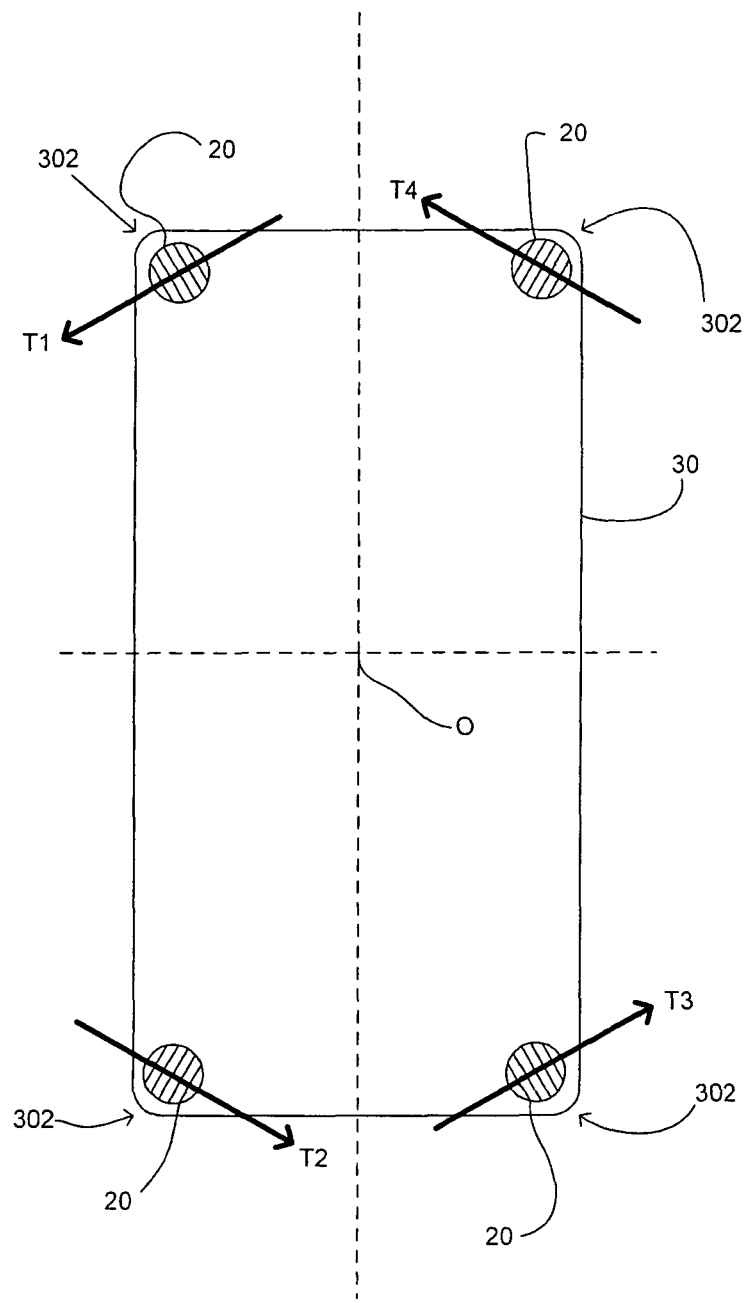
FIG. 4 depicts a schematic underside view of an electronic device according to embodiments.

Vibrational movement of a device can also be transformed into rotational movement of the device by utilizing aligned plural support pads. FIG. 4 depicts the underside of a rectangular electronic device 30 having a support pad 20 affixed at each corner region 302.

Each of the support pads 20 is oriented such that the turning moment (the force imparted on the device×distance from centre of rotation (denoted O)) due to each of the support pads 20 is in an anti-clockwise direction when viewed from underneath the device 20 (the turning moments due to each of the support pads are depicted by arrows T1 to T4). Consequently, as the actuator (not visible) causes the device 30 to vibrate, the device 30 will appear from above (which is the most likely perspective of the user) to rotate in a clockwise direction. It will be understood, however, that by reversing the orientation of the support pads 20, the direction of rotation of the device 30 can be reversed.

In order to impart the maximum possible turning moment, each support pad is oriented such that the resulting turning moment (T1 to T4) is in a direction perpendicular to a virtual line running from the corner at which the support pad is located to the centre of rotation O. It will be appreciated that rotational movement of the device 30 can still be provided even if the support pads 20 are not oriented exactly in this way.

In the case of an electronic device such as a mobile telephone, the support pads 20 may be approximately 5 mm in diameter. The distance between adjacent vertices may be in range of 0.5 to −1 mm. The distance from the boundary B to one of the vertices may be approximately 1 mm. However, it will be understood that, depending on a number of factors including, for example, the weight of the device and size of the device, the extent of travel of the mass in the vibration module, frequency of the primary vibrations and other parameters of the operation of the vibration module, the appropriate protrusion dimensions, number of protrusions per support pad, and also dimensions and number of support pads per device may vary.

Although, in the above embodiments, the support pads have been described as separate entities to the device, it will be understood that the support pads and the device may be integrated with one another.

Figure 5:
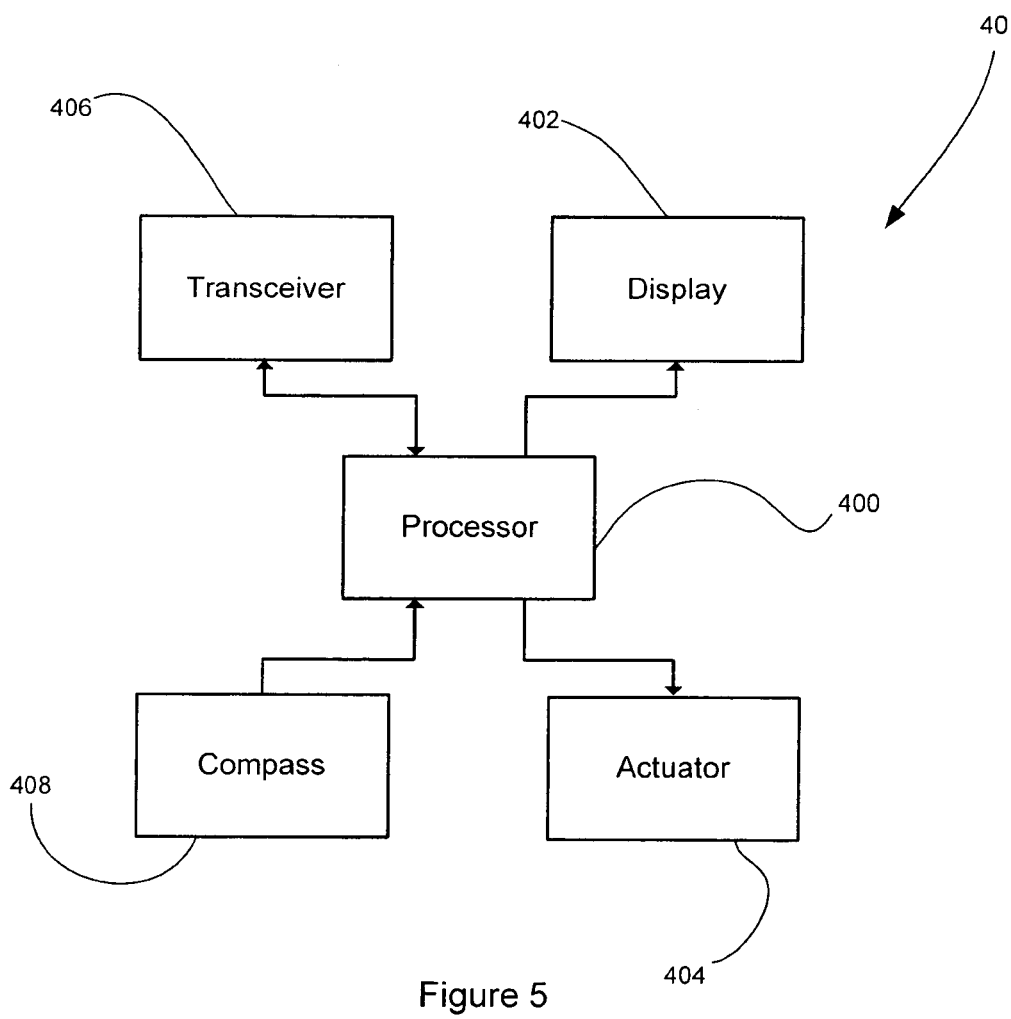
FIG. 5 depicts a schematic of the internal components of embodiments of the electronic device of FIG. 4.

The conversion of vibration to rotation functionality of the mobile phone may be used to facilitate other functionalities of the mobile phone. For example, the electronic device may be controlled to rotate by a particular angle so as to act as a physical pointer to a particular target or location. This functionality is from hereon in termed "physical pointer functionality". FIG. 5 depicts a schematic of the internal components of embodiments of a portable communications device 40. Examples of such devices include mobile telephones, Personal Digital Assistants (PDAs), two-way radios ("walkie-talkies") and the like. The portable communications device 40 comprises a processor 400, a display 402, a vibrator module 404, a transceiver 406 and a compass module 408. The vibrator module 404 constitutes an actuator. The actuator 404 is configured to provide vibrational movement (as described with reference to FIGS. 2A to 2D) of the portable communications device 40. The transceiver 406 is configured to transmit signals to, and to receive signals from other entities via a network. The compass module 408 is configured to determine the orientation of a longitudinal axis of the device 40 with reference to the earth's magnetic field. The compass module 408 may be a solid state compass, for example incorporating a magnetometer and a calibrator. The processor 400 is configured to send signals for transmission to the transceiver 406, to receive signals received by the transceiver 406, to the control the display 402, to receive signals from the compass 408, and to control the operation of the actuator 404.

Figure 6A:
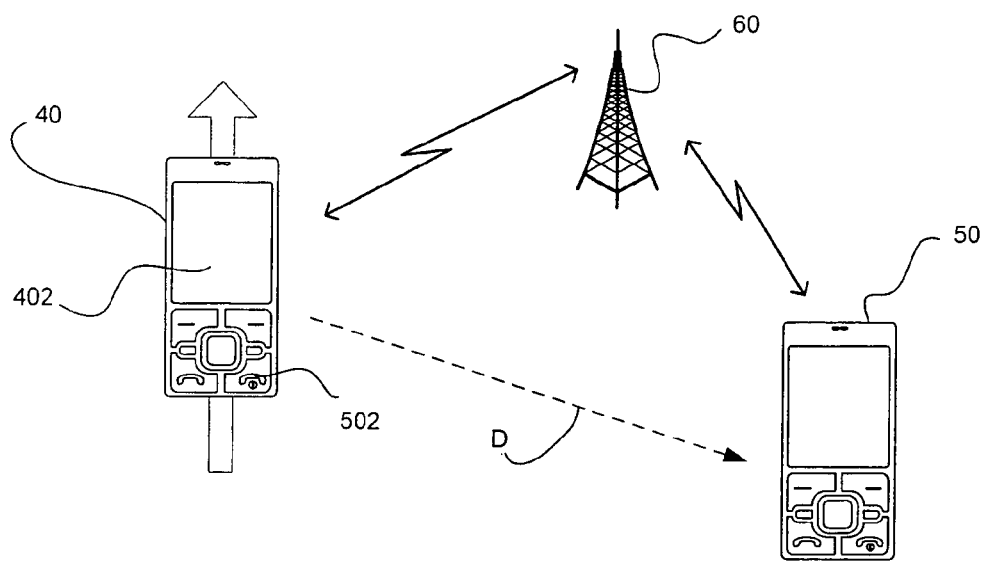
FIGS. 6A to 6C depict an operation of the device of FIG. 5.
Figure 6B:
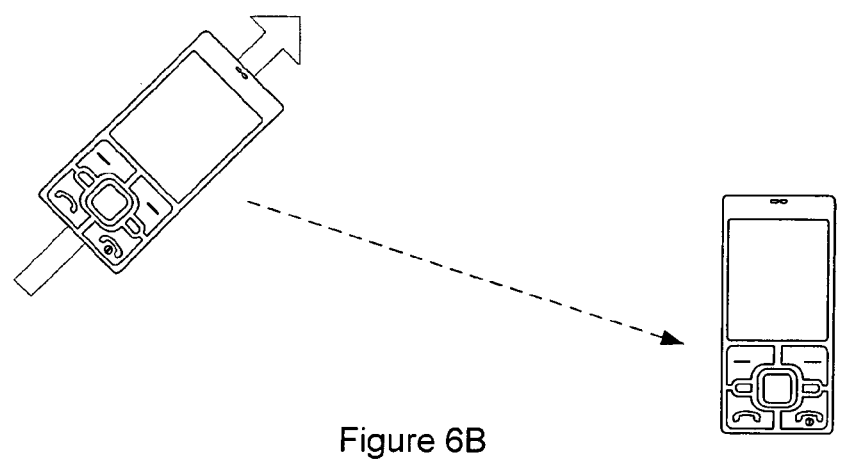
Figure 6C:
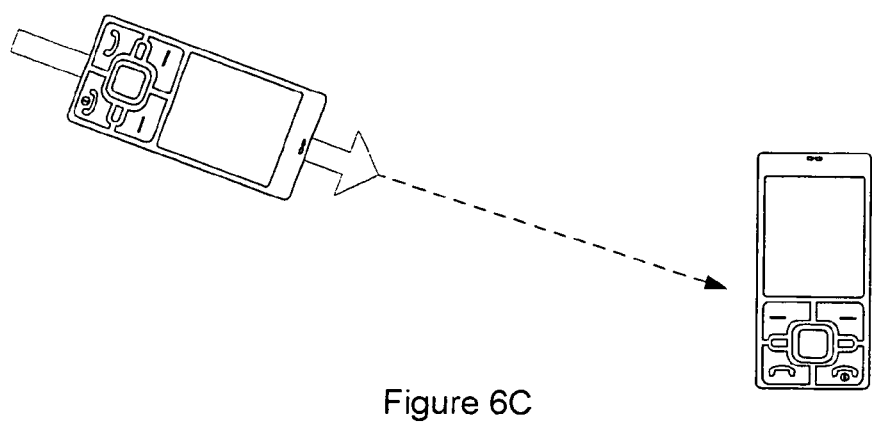
Figure 7:
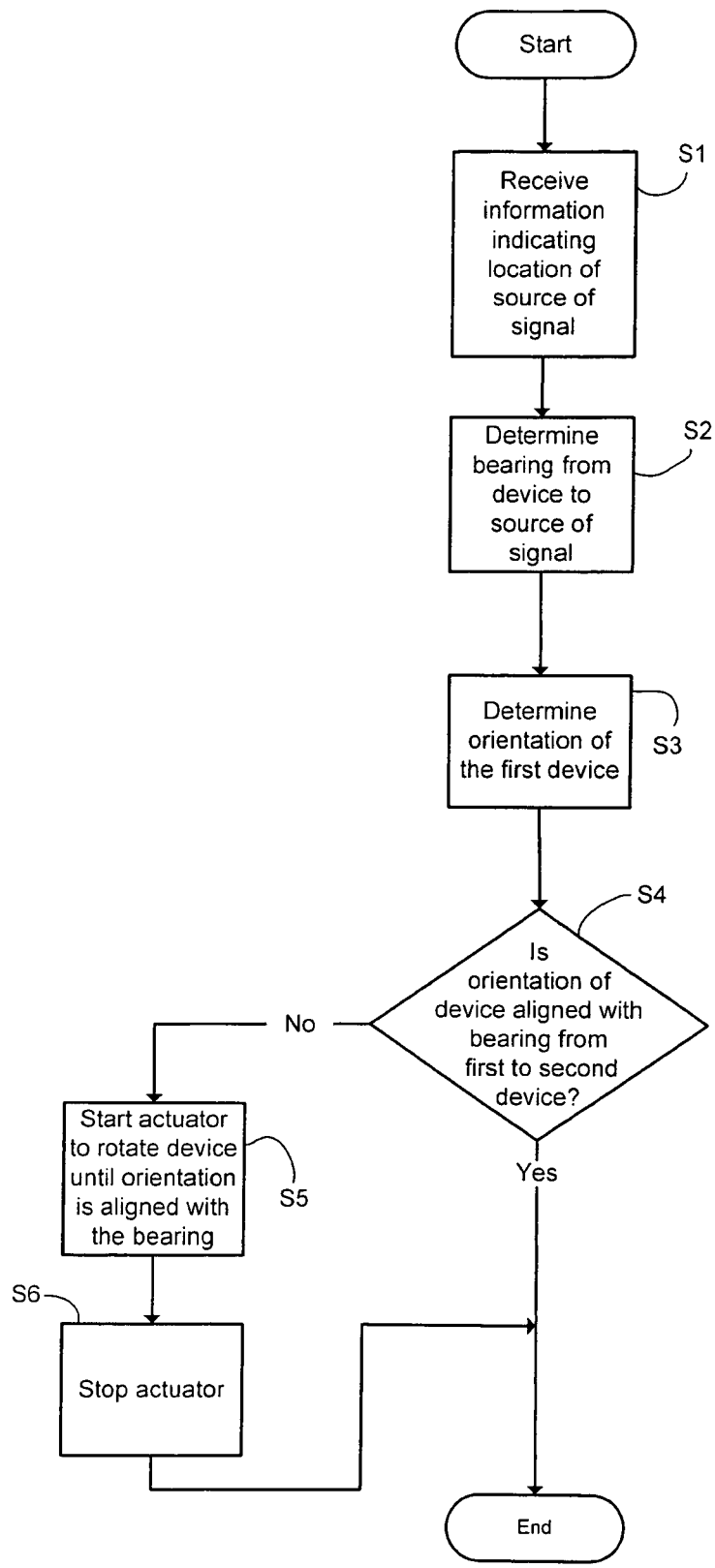
FIG. 7 is a flow-chart depicting an operation of the device of FIG. 5.

FIGS. 6A to 6C depict various stages during the provision, by the portable communication device 40, of physical pointer functionality. FIG. 7 is a flow chart depicting a method of operation of the processor 400 of the device 40 when providing physical pointer functionality. FIGS. 6 and 7 will be described in conjunction with one another.

FIGS. 6A to 6C depict a plan view of the portable communications device 40. The device 40 is situated face-up on a hard surface (not shown), such that the display 402 and keys on a keypad 502 are visible. On a rear surface (not visible) of the portable communications device 40 are provided plural support pads 20 oriented as described with reference to FIG.

4. Thus, when the processor 400 controls the actuator 404 to provide vibrational movement of the portable communication device 40, the device 40 is caused to rotate in a clockwise direction.

In FIG. 6A, the portable communication device 30 receives a notification of an incoming communication from a second communications device 50. The notification is received from the second communications device 50 via a network 60. The communication may comprise an incoming telephone call, an incoming text message, or other incoming data. Information indicating a location of the source of the incoming communication is included with the incoming notification. This information may be, for example, in the form of global positioning system (GPS) coordinates, although it may alternatively take some other form. The information indicating the location of the second communication device may be included in the notification of the incoming communication similarly to caller line identification information (Caller ID).

The location of the device 50 may be determined in any suitable manner. For instance, a network, such as the network 60, may determine the location of the device 50. This may occur utilizing triangulation based on signals received at a number of receiver or transceiver stations located within range of the device 50. In embodiments in which the device 50 does not calculate its location, the location information may pass directly from the network 60, or other location determining entity, to the device 40 without first being provided to the device 50.

In step S1 of FIG. 7, following the receipt of the notification of the incoming communication by the transceiver 406, the information indicating the location of the source of the incoming communication is received by the processor 400.

In step S2, the processor 400 determines the bearing from the location of the portable communications device 40 to the location of the source 50 of the incoming communication. The portable communication device 40 may comprise a GPS receiver module (not shown) to determine its location. The GPS receiver module is configured to locate four or more GPS satellites, to figure out the distance to each, and use this information and a simple mathematical principle called trilateration to deduce its own location.

Alternatively, the location of the device 40 may instead be determined in some other way. For instance, a network, such as the network 60, may determine the location of the device 40. This may occur utilizing triangulation based on signals received at a number of receiver or transceiver stations located within range of the device 40. Alternatively, the device 40 may determine its location using knowledge of transceivers within range of the device 40 and knowledge of the locations and ranges of those transceivers.

The bearing between the device 40 and the source 50 is shown as the dashed arrow (denoted D) on FIGS. 6A to 6C.

In step S3, the processor determines the current orientation of the portable communications device 40 based on signals received from the compass module 408.

In step S4, the processor determines if the current orientation of the device 40 is aligned with the bearing from the portable communications device 40 to the source 50 of the incoming communication. If it is determined that the orientation of the device is not aligned with the bearing from the device 40 to the source 50, the processor (in step S5) controls the actuator 404 to vibrate the device 40. The vibrational movement is transformed by the support pads 20 into rotational movement of the device 40. Thus, the device 40 begins to rotate. This is depicted in FIG. 6B. The processor 400 controls the actuator 404 to rotate the device 40 until it is determined that the orientation of the device 40 is aligned with the bearing from the device 40 to the source 50. Following this, in step S6 the processor controls the actuator to stop rotating the device 40 and the process finishes (this situation is depicted in FIG. 6C).

If it is determined in step S4, that the current orientation of the device is aligned with the bearing from the portable device 40 to the source 50 of the incoming communication, no action is taken and the process finishes.

The physical pointer functionality may have an associated acceptable level of accuracy. This may be, for example, 5 degrees. Therefore, if the orientation of device 40 is determined to be within 5 degrees of the bearing from the device 40 to the source 50, the processor determines that the orientation and the bearing are aligned, and the process finishes. The acceptable level of accuracy may be determined during manufacture, or, alternatively, it may be user-definable.

In some embodiments, the processor 400 may instead operate to provide the physical pointer functionality in a different manner. For example, following step S4, the processor 400 may determine, based on the location of the device, the location of the source and the orientation of the device, the angle through which the device 40 needs to be rotated. Following this determination, the processor 400 may control the actuator to vibrate for a period of time that corresponds to the required angle of rotation.

It should be appreciated that, prior to performing the method of operation of FIG. 7, and following receipt of an incoming signal, the processor may control the actuator to vibrate the device for a predetermined period of time in order to alert to the user that a communication is incoming. After expiry of the predetermined period of time, the processor may then perform the method of FIG. 7, to align the device 40 with the source of the incoming communication.

Figure 8A:
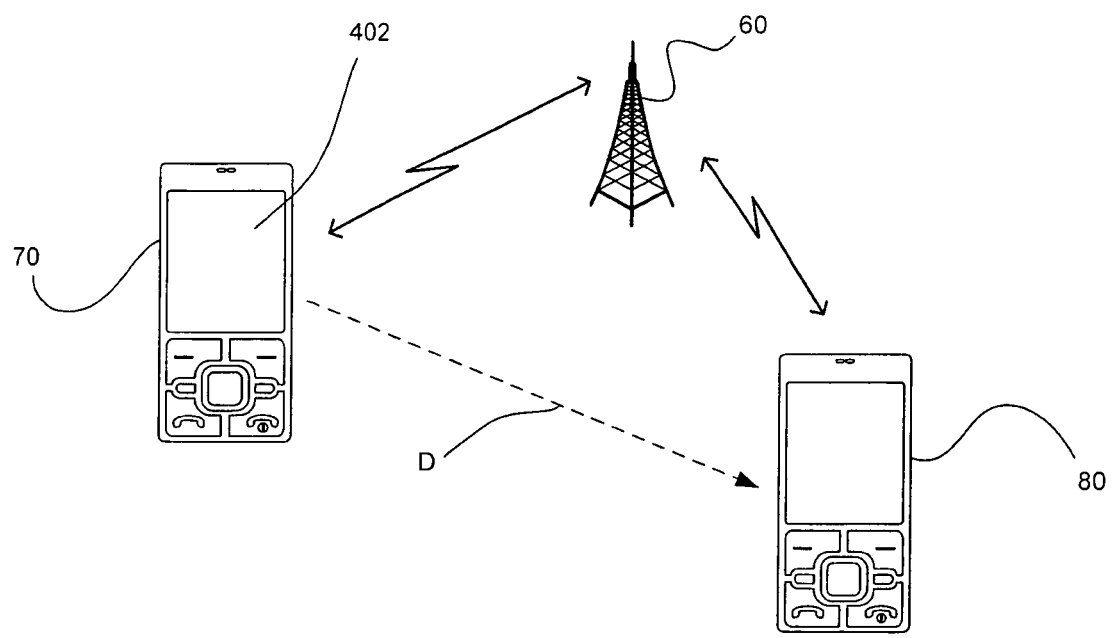
FIGS. 8A and 8B depict an alternative operation of the device of FIG. 5.
Figure 8B:
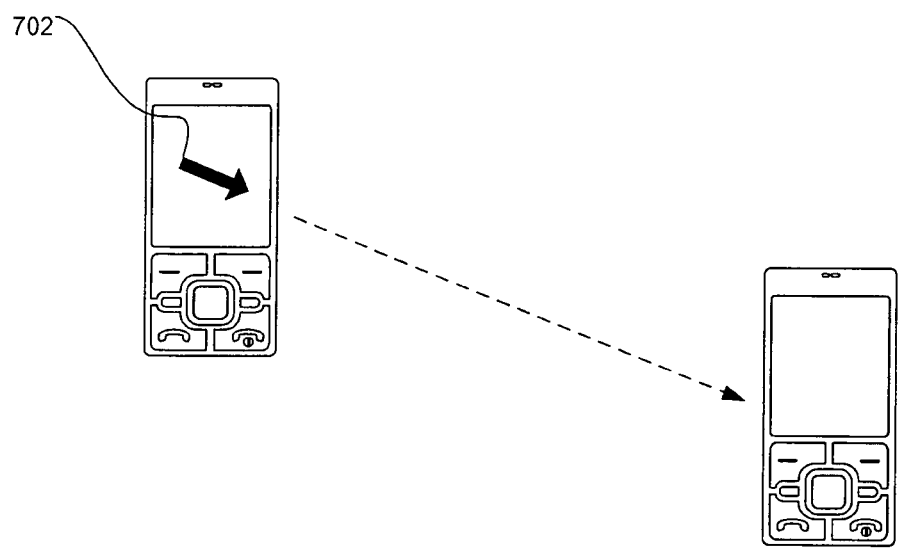
Figure 9:
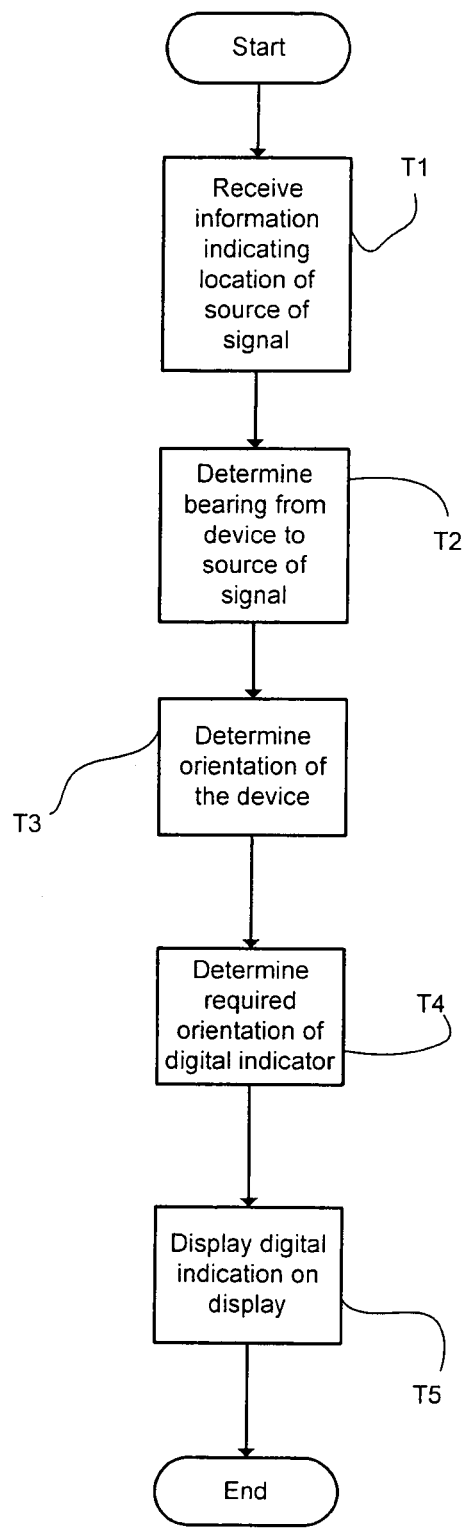
FIG. 9 is a flow chart depicting the alternative operation of the device of FIG. 5.

In other embodiments, instead of rotating the device to act as a physical pointer, a digital pointer (for example an arrow) showing the direction to a communicating device may be displayed on a display (this is termed "digital pointer functionality"). This is illustrated in FIGS. 8A and 8B. FIG. 9 is a flow-chart depicting a method of operation of a processor of device 70 of FIGS. 8. FIGS. 8 and 9 will be described in conjunction with one another.

The device 70 may have the same structure as the device 40 described with reference to FIGS. 5 and 6. It will be appreciated, however, that the device may alternatively not include the actuator and/or the support pads 20. For ease of understanding, the reference numerals relating to the internal components of device 40 of FIGS. 5 and 6 will be used in relation to like components of the device 70 of FIGS. 8.

In FIG. 8A, a first portable communication device 70, which comprises a display 402, receives a notification of an incoming communication from a second portable communication device 80. The notification is received from the second communication device 80 via a network 60. The incoming communication may comprise an incoming telephone call, an incoming text message, or other incoming data. Information indicating a location of the source of the incoming communication is included in the incoming signal. This information may be, for example, in the form of global positioning system (GPS) coordinates, although it may alternatively take some other form. The information indicating the location of the second communication device 80 may be included in the notification of the incoming communication similarly to caller line identification information (Caller ID).

The location of the device 80 may be determined in any suitable manner. For instance, a network, such as the network 60, may determine the location of the device 80. This may occur utilizing triangulation based on signals received at a number of receiver or transceiver stations located within range of the device 80. In embodiments in which the device 80 does not calculate its location, the location information may pass directly from the network 60, or other location determining entity, to the device 70 without first being provided to the device 80.

In step T1 of FIG. 9, following the receipt of the notification of the incoming communication, the information indicating the location of the source 80 of the incoming communication is received by a processor 400 of device 70.

In step T2, the processor 400 determines the bearing from the location of the portable communications device 70 to the location of the source 80 of the incoming communication. The portable communication device 70 may further comprise a GPS receiver module (not shown) to determine its location. The GPS receiver module is configured to locate four or more GPS satellites, to determine the distance to each, and to use this information and a simple mathematical principle called trilateration to deduce its own location.

Alternatively, the location of the device 70 may instead be determined in some other way. For instance, a network, such as the network 60, may determine the location of the device 70. This may occur utilizing triangulation based on signals received at a number of receiver or transceiver stations located within range of the device 70. Alternatively, the device 70 may determine its location using knowledge of transceivers within range of the device 70 and knowledge of the locations and ranges of those transceivers.

In step T3, the processor 400 determines the current orientation of the portable communications device based on a signal received from the compass module 408.

In step T4, the processor 400 determines, based on the bearing from the device 70 to the source 80 and orientation of the device 70, the orientation of an arrow, to be displayed on the display screen, indicating the direction the source 80 of the incoming communication.

In step T5, the processor 400 controls the display 402 to display the arrow 702 indicating the source 80 of the incoming signal. This is depicted in FIG. 8B.

It will be understood that during the provision of "digital pointer functionality" it is not necessary for the device to be on a flat surface, such as a table. The phone may instead be held in a user's hand. The device will display a direction to the source of the incoming communication that is based on the orientation of the device at the moment at which the device determines the direction.

It will be understood that the physical pointer and digital pointer functionalities may also be applied to the device initiating a communication (i.e. the source). For example, with reference to the "physical pointer functionality", a device that is initiating the communication with another device may be controlled to rotate to point to the location of the other device. FIGS. 6 illustrate this, if the roles of the two devices 40, 50 are reversed such that first device 40 is initiating a communication with the second device 50. The location information of the other device could be provided to the initiating device prior to or during call set up. Similarly, both the initiating device and the receiving device could be controlled to rotate to point to the location of the other device. It will be understood that the above also applies to the "digital pointer functionality", wherein the initiating device could be controlled to provide an arrow, or other suitable indicator, indicating the direction to the receiving device. Similarly, both devices could be controlled to display an indication of the direction towards the other device.

Based on the "digital pointer functionality" a dedicated "Find Me" SMS service may be provided. This service may allow an SMS to be sent from one device to another, the SMS causing each of two devices to indicate the direction to the other device.

It will be understood that the distances between the communicating devices of FIGS. 6 and 8 may not be crucial. The distance for instance may take any value between 1 m and thousands of kilometers.

The provision of the physical pointer and digital pointer functionalities enriches a user's interaction with their portable communication device by making the user aware of the physical direction to a source or destination of digital information. It may also help a user to familiarize themselves with their surrounding environment and to stimulate the user to think about the geographical relationship between them and those with which they communicate. It also may be used by a person to aid in the location of people and/or places. For example, if two people are in a crowded public place, the pointer provided by the device may help people locate one another.

It is known for a portable communications device, such as a mobile phone 40, to vibrate when an incoming signal, such as a phone call, a text message or a service, is received. However, the rotational movement provided by the vibration in conjunction with the support pads 20 gives the user another clear indication that a communication is incoming. This may be of particular use to users with hearing difficulties, who may be unable to hear an audible alert. It may also be of particular use to users, when in environments in which silence is required, for example libraries, meetings etc. Also, the rotation of the mobile phone provides a clear indication if, for example, a call has been missed. This is because the orientation of the mobile phone on the surface will have changed in relation to the orientation of the surface itself and in relation to other objects on that might be on the surface.

This may be of particular use, for example, if the user of the mobile phone is situated at a distance from the user, for example at the other side of a room. This is because, from such a distance it is unlikely that the user will be able to read anything displayed on the display, but they will be able to recognise easily if the orientation of the mobile phone has changed. It will be appreciated that the trigger for causing the actuator to vibrate may be something other than an incoming communication. It may be, for example, the expiry of a countdown timer or the arrival of a pre-selected time (i.e. when the device is acting as an alarm clock).

Although in the above embodiments rotation of the device is provided by a combination of the actuator and support pads, it should be understood that rotation of the device may instead be provided in an alternative manner. For example, the electronic device may be provided at one longitudinal end with a pivot and at the other with a wheel, the wheel being configured to drive the end of electronic device substantially perpendicular to the longitudinal axis of the electronic device. As such, when the wheel is controlled to rotate, it will cause rotation of the electronic device around the pivot.

Figure 10A:
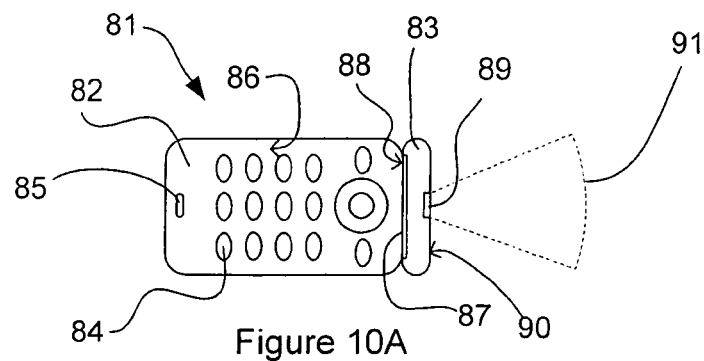
FIG. 10 depicts operation of a device according to alternative embodiments.
Figure 10B:
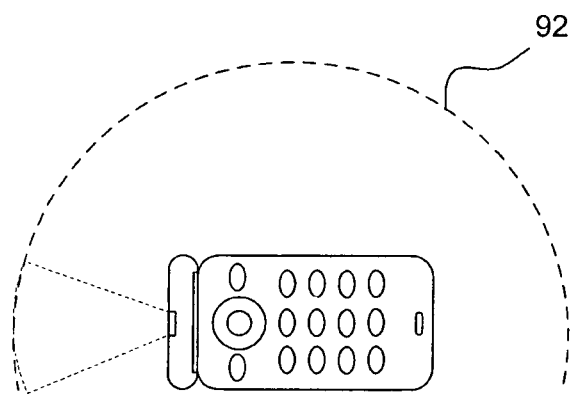
Figure 10C:
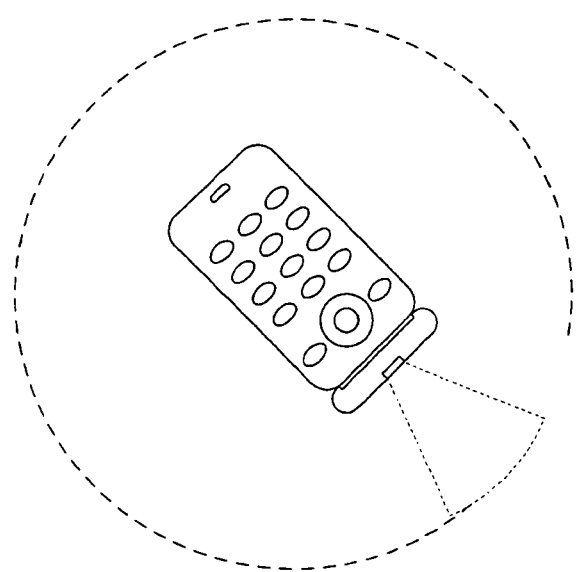

Another functionality facilitated by the vibration-to-rotation functionality is that of "360-degree photography". FIGS. 10A to 10C depict the operation of a mobile device 81 during the provision of this functionality.

The device 81 is a clam-shell flip-type mobile phone 81. The device 81 is shown in plan view, i.e. the surface on which the device 81 is resting has the same plane as the figure. The device comprises a first portion 82 and a second portion 83. The first and second portions 82, 83 are pivotally connected by a hinge joint (not shown). In FIGS. 10, the clam-shell mobile phone 81 is in an 'open' configuration, with the angle between the first and second portions 82, 83 being approximately 90-degrees. The first portion 82 includes a keypad 84 and a microphone 85 located on an inner surface 86.

Located on an outer surface (not shown) of the first portion 82, opposite the inner surface 86, are plural support pads (not shown), such as those depicted in FIG. 4, for transforming vibration provided by a vibrational module (not shown) into rotational movement of the device 81. The device 81 is situated with the outer surface of the first portion 82 face-down on a flat surface (not shown). The second portion 83 of the device 81 includes a display screen 87 located on an inner surface 88 and a camera 89 located on an outer surface 90. In FIG. 1A, the camera 89 is operable to provide images of a 'visible region' 91.

In FIG. 10B, the mobile phone has been rotated through approximately 180-degrees. During rotation from the position of FIG. 10A to that of FIG. 10B, the camera 89 is operable to provide images of an arc 92 of approximately 180-degrees around the mobile phone 81.

In FIG. 10C, the mobile has nearly completed a full 360-degree rotation. Consequently, the arc 92 covers almost 360-degrees around the mobile phone 81. It will be understood that, by rotating the mobile device 81 through 360-degrees, the camera 89 can provide images of the full 360-degrees around the mobile device 81.

This functionality can be utilized in a number of ways. For example, by controlling the camera 89 to take single photographs at intervals during rotation of the mobile phone 81, a 360-degree panoramic photograph can be provided. The intervals could be regular. The vibration-induced rotation of the mobile phone 81 may be stopped temporarily whilst the camera is operated to capture a photograph.

This functionality can also be used in conjunction with a video camera mode. In this way, a video showing 360-degrees around the mobile device can be obtained. The vibration-induced rotation of the mobile phone 81 may or may not be stopped temporarily during the video capture. This, in turn, can be combined with video calling functionality, to transmit the video of the region surrounding the mobile phone to a second device. This process can be manually controlled, with the user of the mobile phone 81 initiating a video call with another device and then controlling a vibration module of the mobile phone 81 to cause rotation. Alternatively, the process may be fully automated, with a first device sending a function-specific SMS to a second device, the SMS being able to trigger a video call between the two devices and to control the second device to rotate through 360-degrees, thereby allowing the user of the first device to view the environment surrounding the second device. Rotation may be achieved other than by using vibration, for instance using one of the rotation techniques described above in relation to other embodiments.

It should be realized that the foregoing embodiments should not be construed as limiting. Other variations and modifications will be apparent to persons skilled in the art upon reading the present application. Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

What is claimed is:

1. An apparatus comprising:
    a single actuator configured to provide vibrational movement of the apparatus in a first plane or having a component in the first plane;
    a direction indicator configured to indicate to a user a direction from the apparatus to a location of interest, wherein the location of interest identifies at least one of: a location of a source of an incoming communication, or a location of a destination of an outgoing communication;
    a processor configured to control the single actuator to align an axis of the apparatus with the direction; and
    a plurality of traction parts each configured to support a portion of the apparatus on a surface, a plane of the surface being perpendicular to the first plane, the traction part being configured to transform the vibrational movement of the apparatus into movement of the portion of the apparatus in the direction along the surface, the direction of the movement being predetermined by an orientation of the traction part;
    wherein the plurality of traction parts are oriented to provide net rotational movement of the apparatus about a center of rotation in response to the single actuator, and
    wherein for each respective traction part of the plurality of traction parts the apparatus has a corresponding turning moment in response to the single actuator.

2. The apparatus according to claim 1, wherein, for each of the plurality of traction parts, the direction along the surface is substantially perpendicular to a line from the traction part to the center of rotation.

3. The apparatus according to claim 1, wherein each of the plurality of traction parts is configured to support a different corner portion of the apparatus.

4. The apparatus according to claim 1, wherein one or more of the plurality of traction parts comprises a plurality of protruding portions extending from the apparatus, wherein each of the plurality of protruding portions comprises a first edge, a second edge, and a vertex at a meeting point of the first and second edges, and wherein each of the plurality of protruding portions is asymmetric about an axis, the axis being substantially perpendicular to the plane of the surface and passing through the vertex.

5. The apparatus according to claim 1, wherein one or more of the plurality of traction parts comprises a plurality of protruding portions extending from the apparatus, wherein each of the plurality of protruding portions comprises a first edge, a second edge, and a vertex at a meeting point of the first and second edges, wherein the first edge each of the plurality of protruding portions is substantially parallel to the first edges of the other protruding portions, the second edge each of the plurality of protruding portions is substantially parallel to the second edges of the other protruding portions, and wherein a vertical gradient of the second edge has a greater magnitude than a vertical gradient of the first edges.

6. The apparatus according to claim 1, wherein one or more of the plurality of traction parts comprises a plurality of protruding portions extending from the apparatus, wherein each of the plurality of protruding portions comprises a first surface, a second surface, and a vertex at a meeting point of the first and second surfaces, wherein the first surface each of the plurality of protruding portions is substantially parallel to the first surfaces of the other protruding portions, the second surface each of the plurality of protruding portions is substantially parallel to the second surfaces of the other protruding portions, and wherein a vertical gradient of the second surface has a greater magnitude than a vertical gradient of the first surfaces.

7. An apparatus comprising:
    a plurality of traction parts each configured for supporting a portion of a device on a surface, each of the plurality of traction parts being configured such as to transform vibrational movement in, or having a component in, a plane perpendicular to a plane of the surface into a net force along the surface in a direction predetermined by the configuration of the traction part; and a single actuator configured to provide vibrational movement of the device in a first plane or having a component in the first plane;

the device including a direction indicator configured to indicate to a user a direction from the device to a location of interest, wherein the location of interest identifies at least one of: a location of a source of an incoming communication, or a location of a destination of an outgoing communication; and the device further including a processor configured to control the single actuator to align an axis of the device with the direction;

wherein the plurality of traction parts are oriented to provide net rotational movement of the apparatus about a center of rotation in response to the single actuator, and wherein for each respective traction part of the plurality of traction parts the apparatus has a corresponding turning moment in response to the single actuator.

8. The apparatus according to claim 7, wherein one or more of the plurality of traction parts comprises a plurality of protruding portions, wherein each of the plurality of protruding portions comprises a first edge, a second edge, and a vertex at a meeting point of the first and second edges, and wherein each of the plurality of protruding portions is asymmetric about an axis, the axis being substantially perpendicular to the plane of the surface and passing through the vertex.

9. The apparatus according to claim 7, wherein one or more of the plurality of traction parts comprises a plurality of protruding portions wherein each of the plurality of protruding portions comprises a first edge, a second edge, and a vertex at a meeting point of the first and second edges, wherein the first edge each of the plurality of protruding portions is substantially parallel to the first edges of the other protruding portions, the second edge each of the plurality of protruding portions is substantially parallel to the second edges of the other protruding portions, and wherein a vertical gradient of the second edge has a greater magnitude than a vertical gradient of the first edges.

10. The apparatus according to claim 7, wherein one or more of the plurality of traction parts comprises a plurality of protruding portions, wherein each of the plurality of protruding portions comprises a first surface, a second surface, and a vertex at a meeting point of the first and second surfaces, wherein the first surface each of the plurality of protruding portions is substantially parallel to the first surfaces of the other protruding portions, the second surface each of the plurality of protruding portions is substantially parallel to the second surfaces of the other protruding portions, and wherein a vertical gradient of the second surface has a greater magnitude than a vertical gradient of the first surfaces.

11. The apparatus of claim 1 further comprising:
an orientation detector configured to detect an orientation of the apparatus; and
a processor configured to process the detected orientation of the apparatus, a location of the apparatus and received information identifying the location of interest in order to determine the direction from the apparatus to the location of interest.

12. The apparatus according to claim 1, wherein the direction indicator comprises the single actuator.

13. The apparatus according to claim 11, wherein the direction indicator comprises a display operable under control of the processor to indicate the direction from the apparatus to the location of interest.

14. The apparatus according to claim 11, wherein the apparatus comprises a mobile communication device.

15. An apparatus comprising:
a processor configured to process a received orientation, a first location and received information identifying a location of interest in order to determine a direction from the first location to the location of interest, and to provide an output indicating the direction from the first location to the location of interest; and
a direction indicator configured to indicate to a user the direction from the apparatus to the location of interest, wherein the location of interest identifies at least one of: a location of a source of an incoming communication, or a location of a destination of an outgoing communication;
wherein the apparatus comprises a single actuator and a plurality of traction parts, the processor further configured to control the single actuator to align an axis of the apparatus with the direction: the plurality of traction parts being oriented to provide net rotational movement of the apparatus about a center of rotation in response to the single actuator, and
wherein for each respective traction part of the plurality of traction parts the apparatus has a corresponding turning moment in response to the single actuator.

16. A method comprising:
processing a received orientation, a first location and received information identifying a location of interest;
wherein the orientation is received from an apparatus comprising a single actuator and a plurality of traction parts, the plurality of traction parts being oriented to provide net rotational movement of the apparatus about a center of rotation in response to the single actuator, and
wherein for each respective traction part of the plurality of traction parts the apparatus has a corresponding turning moment in response to the single actuator;
determining a direction from the first location to the location of interest;
providing an output indicating the direction from the first location to the location of interest; wherein the location of interest identifies at least one of: a location of a source of an incoming communication, or a location of a destination of an outgoing communication; and
controlling the single actuator to align an axis of the apparatus with the direction.

17. A non-transitory computer program product containing computer code which when executed by computer apparatus, controls the computer apparatus to perform a method comprising:
processing a received orientation, a first location and received information identifying a location of interest; wherein the orientation is received from an apparatus comprising a single actuator and a plurality of traction parts, the plurality of traction parts being oriented to provide net rotational movement of the apparatus about a center of rotation in response to the single actuator, and
wherein for each respective traction part of the plurality of traction parts the apparatus has a corresponding turning moment in response to the single actuator;
determining a direction from the first location to the location of interest;
providing an output indicating the direction from the first location to the location of interest; wherein the location of interest identifies at least one of: a location of a source of an incoming communication, or a location of a destination of an outgoing communication; and controlling the single actuator to align an axis of the apparatus with the direction.

18. An apparatus comprising:
an orientation detector configured to detect an orientation of the apparatus in at least two dimensions;
a single actuator configured to rotate the apparatus; and
a processor configured to control the single actuator based on the detected orientation of the apparatus,
a direction indicator responsive to the orientation detector and configured to indicate to a user a direction from the apparatus to a location of interest, wherein the location of interest identifies at least one of: a location of a source of an incoming communication, or a location of a destination of an outgoing communication;
the processor further configured to control the single actuator to align an axis of the apparatus with the direction; and
wherein the apparatus is a portable electronic device;
wherein the apparatus comprises a plurality of traction parts, the plurality of traction parts being oriented to provide net rotational movement of the apparatus about a center of rotation in response to the single actuator, and
wherein for each respective traction part of the plurality of traction parts the apparatus has a corresponding turning moment in response to the single actuator.

19. The apparatus according to claim 18, wherein the apparatus is a mobile communications device, and wherein the processor is configured to control the single actuator to rotate the device in response to the receipt of a notification of an incoming communication.

20. A method comprising:
detecting an orientation of an apparatus which is a portable electronic device;
rotating the apparatus based on the detected orientation of the portable electronic device;
indicating a direction from the apparatus to a location of interest, wherein the location of interest identifies at least one of: a location of a source of an incoming communication, or a location of a destination of an outgoing communication; and
controlling a single actuator to align an axis of the apparatus with the direction;
wherein the apparatus comprises the single actuator and a plurality of traction parts, the plurality of traction parts being oriented to provide net rotational movement of the apparatus about a center of rotation in response to the single actuator, and
wherein for each respective traction part of the plurality of traction parts the apparatus has a corresponding turning moment in response to the single actuator.

21. The method of claim 20 further comprising rotating the portable electronic device in response to the receipt of a notification of an incoming communication.

22. The method of claim 20 further comprising rotating the portable electronic device in response to an expiry of a predetermined period of time or the reaching of a predetermined time.

23. An apparatus comprising:
a single actuator configured to rotate the apparatus on a surface;
a camera module configured to capture images;
a processor configured to control the single actuator to rotate the apparatus and to control the camera module to capture a plurality of images at a plurality of different orientations of the apparatus,
a direction indicator configured to indicate to a user a direction from the apparatus to a location of interest, wherein the location of interest identifies at least one of: a location of a source of an incoming communication, or a location of a destination of an outgoing communication;
the processor further configured to control the single actuator to align an axis of the apparatus with the direction; and
wherein the apparatus is a portable device;
wherein the apparatus comprises a plurality of traction parts, the plurality of traction parts being oriented to provide net rotational movement of the apparatus about a center of rotation in response to the single actuator, and
wherein for each respective traction part of the plurality of traction parts, the apparatus has a corresponding turning moment in response to the single actuator.

24. An apparatus according to claim 23, wherein the processor is configured to control the camera module to capture the plurality of images at regular intervals during rotation of the apparatus.

25. An apparatus according to claim 23 wherein the plurality of images comprises a video recording.

26. An apparatus according to claim 23, wherein the apparatus comprises a portable communications device, and wherein the processor is configured to control the single actuator and the camera module in response to the receipt of a communication from another device.

27. An apparatus according to claim 23, wherein the single actuator comprises a vibration module configured to provide vibrational movement of the device in a first plane, and
a traction part configured to support a portion of the device on the surface, a plane of the surface being different to the first plane, the traction part being configured to transform the vibrational movement of the device into movement of the portion of the device along the surface, the direction being predetermined by an orientation of the traction part.

28. A method comprising:
rotating a portable electronic device comprising a camera module and a single actuator configured to rotate said portable electronic device on a surface;
indicating a direction from the device to a location of interest, wherein the location of interest identifies at least one of: a location of a source of an incoming communication, or a location of a destination of an outgoing communication;
controlling a single actuator to align an axis of the device with the direction; and
capturing a plurality of images using said camera module at a plurality of different orientations of the device;
wherein the device comprises a plurality of traction parts, the plurality of traction parts being oriented to provide net rotational movement of the apparatus about a center of rotation in response to the single actuator, and
wherein for each respective traction part of the plurality of traction parts the apparatus has a corresponding turning moment in response to the single actuator.

29. The method of claim 28, wherein rotating comprises providing vibrational movement of the device in a first plane, and using a traction part supporting a portion of the device on the surface, a plane of the surface being different to the first plane, to transform the vibrational movement of the device into movement of the portion of the device along the surface, the direction being predetermined by an orientation of the traction part.

30. The apparatus according to claim 18, wherein the apparatus further comprises a clock or timer function, and the processor is configured to control the single actuator to rotate the device in response to an expiry of a predetermined period of time or the reaching of a predetermined time.

* * * * *